Sept. 8, 1931. J. E. BUTLER 1,821,961
PROCESS OF MAKING HYDRAULIC PRODUCTS FROM ANHYDRITE
Filed March 26, 1929
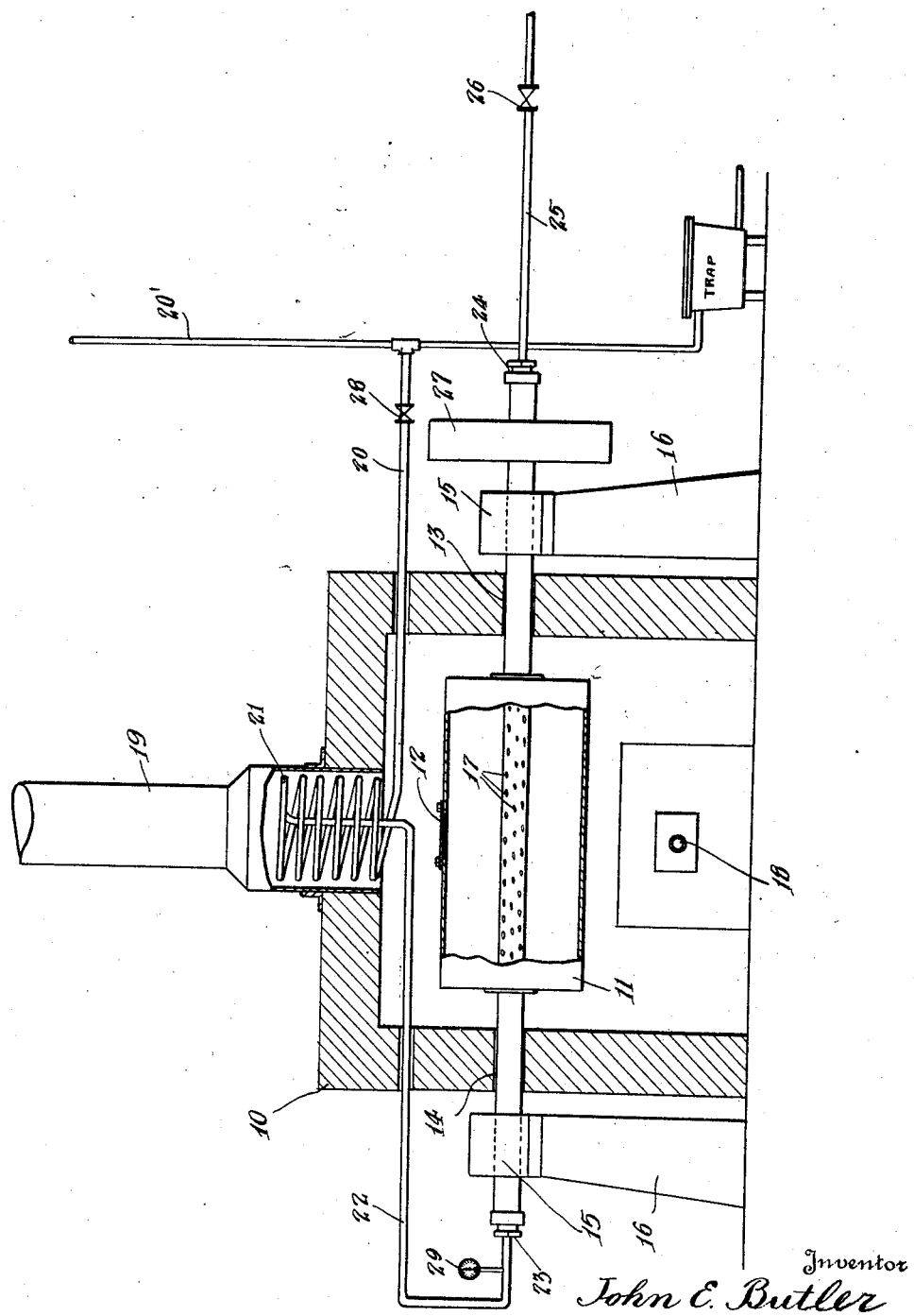
Inventor
John E. Butler
By Lyon & Lyon
Attorneys Patented Sept. 8, 1931

1,821,961

UNITED STATES PATENT OFFICE

JOHN E. BUTLER, OF REDWOOD CITY, CALIFORNIA

PROCESS OF MAKING HYDRAULIC PRODUCTS FROM ANHYDRITE

Application filed March 26, 1929. Serial No. 350,031.

This invention relates to a process of treating materials containing substantially anhydrous calcium sulphate or anhydrite as a major ingredient, in the manufacture of a cementitious material, cement or a plaster therefrom.

Anhydrite may be a naturally occurred anhydrous $CaSO_4$ which in its purest state occurs naturally in the form of rhombic crystals. Artificial anhydrite is a product of certain industries and it is to be understood that by anhydrite, as used hereafter in this disclosure, I wish to embrace not only the pure, native anhydrite, but also the artificial anhydrite as well as materials containing natural or artificial anhydrite as a major ingredient in addition to other materials which may be termed impurities. Such other materials may include silicates, aluminates, gypsum and clayey materials, such as are generally found in deposits of anhydrite or in artificial anhydrite.

Anhydrite is apparently incapable of hydrating and setting so as to form a solid cast or body after being mixed with water and allowed to dry. Numerous attempts have been made to treat anhydrite so as to enable it to hydrate and to use such anhydrite as a source of calcium sulphate, for the manufacture of gypsum, plaster or other materials capable of setting when mixed with water. Such previous attempts have not been commercially successful, while the hereinafter described method enables one to manufacture a very efficient material from anhydrite.

An object of this invention is to provide a process of treating material containing anhydrite as a major ingredient in the production of a cementitious or plastering material therefrom.

Another object is to provide a method of producing a cementitious material capable of setting into a hard, dense mass from a material containing anhydrite.

Another object is to provide a method of treating anhydrite so as to enable the anhydrite to be used as a cementitious material capable of setting and forming masses having relatively much higher compression strength than any other cementitious material containing calcium sulphate.

Another object is to provide a finely divided material containing calcium sulphate as a major ingredient having the property of forming a plastic mass when mixed with water and setting to form a hard, dense and structurally strong mass when dried.

Other objects, advantages, uses and characteristics of the process and product embraced by my invention will become apparent to those skilled in the art from the following detailed description thereof.

I have discovered that natural or artificial anhydrite or materials containing anhydrite as their major ingredient, which materials when in finely divided form and mixed with water, have no setting properties, will be transformed into cementitious materials of great bonding strength, density and hardness, after being treated with steam or water vapor under conditions hereafter to be described in detail. The resulting product in finely divided form, after being mixed with accelerators and hardeners such as are now being ordinarily used in the manufacture of Keene cement, have physical properties which are much more valuable than those of best grades of Keene cement now on the market. My product, moreover, differs materially from known cementitious materials composed mainly of calcium sulphate, in that during and after setting, the mass does not develop star or needle-like crystals ordinarily observed in known gypsum cements, but instead, appears to set by the aid of a cementitious solution apparently derived from undefined solid particles constituting the mass of the material. By reason of such cementing solution, the resulting cast or set body is very dense, hard and strong.

The product produced in accordance with my invention is not to be confused with Keene cement now on the market, nor with the slow setting calcium sulphate cements produced by calcining gypsum at temperature of 1800° or thereabouts.

Neither is my product to be confused with ordinary plaster of Paris of $CaSO_4.1/2H_2O$. The properties of my product have no points in common with any of the above materials and the closest approach thereto is the well known Keene cement which will be used hereafter as a basis of comparison.

In general, the process invented and discovered by me comprises grinding anhydrite to a state of fine division, subjecting such finely divided anhydrite to steam treatment, then cooling and lightly milling the treated material and then, if desired, adding well known accelerators and hardeners to the material.

The anhydrite should be preferably ground to pass a 100 mesh screen sieve, and although very good results are obtained by the use of anhydrite ground to pass 100 and 90% passing through a 200 mesh sieve, it is desirable to grind the anhydrite so that all of it passes a 200 mesh sieve. The ground anhydrite may then be subjected to the action of steam or moist heated air, the temperature of the air or steam being preferably above about 180° and generally between about 250 and 450 degrees Fahrenheit. Although saturated steam may be used, it appears to be desirable to use super-heated steam. Furthermore, the contacting of the finely ground anhydrite with steam, for example, should be preferably carried out at super-atmospheric pressures, such as, for example, pressures of 20 to about 150 pounds gauge. The condensation of water or steam during the treatment of finely divided anhydrite is to be preferably minimized or prevented.

The time of contact between the water vapor or steam and the anhydrite may vary over wide limits, for example, from a few minutes to several hours, depending somewhat upon the temperature during such contacting period and the pressure employed.

After the above described treatment, the finely divided anhydrite may be lightly milled so as to disintegrate any small lumps or balls which may have formed, then cooled and dried. It will be found that only an inappreciable quantity of water has been combined with treated anhydrite during the process, but the anhydrite has been changed in its physical properties (and probably in structure), so that upon mixing the treated anhydrite with water, the material will hydraulically set and harden, the setting time being somewhat dependent upon the quantity and character of accelerator and hardener added after the hereinabove described steam treatment.

It may be here stated that during the drying of the steam heated anhydrite, subsequent to the steam treatment above described, it may be desirable to employ temperatures not exceeding 120 or 125° F., so as to prevent dehydration of the treated material and the elimination of any moisture which may be combined with the anhydrite during such steam treatment. Higher temperatures, such as for example, temperatures of 150 to 160° may also be used, but are not recommended unless a material of slightly different characteristics is desired.

The cool, dried, finely divided, steam treated material may be mixed with well known accelerators and hardeners such as alkali or alkaline earth sulphates and common alum. Generally, less than 1% by weight of alkaline or alkaline earth sulphate and less than 1% by weight of alum need be added, but in all cases, not more than about 2% by weight of each of these materials should be added. It will be understood that other accelerators or hardeners may be substituted for the sulphates and alum hereinabove identified.

In order to more clearly describe the invention and the process preferably used, reference shall be made to the appended drawing, which illustrates diagrammatically a vertical section of a treating apparatus which may be used. The treating apparatus may consist of a housing 10 in which is rotatably mounted a treating cylinder 11 provided with an inlet and discharge opening closed by means of a removable cover plate 12. The treating cylinder 11 may be mounted upon a hollow shaft or pipe 13, extending entirely through the housing 10 through suitable opening 14. The pipe 13 may be journaled in bearings 15 positioned externally of the housing 10 upon pillars or other supports 16. The pipe 13 may be provided with suitable perforations, openings or nozzles 17 discharging into the treating cylinder 11.

Means may be provided for heating the interior of the housing 10 as by means of a furnace or burner 18, or instead of using a burner, gases from a separate combustion chamber may be admitted into the housing 10 externally of the treating cylinder 11. The housing 10 may also be provided with a stack 19.

A steam supply means such as the line 20' may be provided leading from a boiler or other source of steam not shown in the drawing. The line 20' may be connected to a line 20 leading into the housing 10 and connected with a coil or similar super-heater means 21 positioned within the housing 10 or as shown in the drawing, positioned in the stack 19. The pipe 22 may lead from the coil or super-heater means 21 and be connected to the perforated pipe 13 by means of a suitable swivel joint or other similar coupling 23. The opposite end of pipe 13 may also be connected by means of a swivel joint 24 with an exhaust pipe 25 which may be provided with a pressure release valve 26. The pipe 25 may discharge into the atmosphere, or the exhaust steam may be conducted for further use in any suitable apparatus.

The hollow shaft or pipe 13 may be driven in any suitable manner, for example by means of pulley 27 mounted upon the shaft of pipe 13 and driven by means of a belt from a motor or other suitable prime mover, not shown. Furthermore, a valve 28 may be provided in line 20 and a pressure gauge 29 connected to line 22.

In operating the invention with the use of the apparatus shown in the drawing, finely divided anhydrite or a material containing anhydrite as a major ingredient and preferably ground so as to substantially pass a 200 mesh sieve, is charged into the treating cylinder 11 through the inlet 12 and the cover then clamped in place.

The furnace 18 is then started and simultaneously, steam admitted into the treating cylinder 11 by opening valve 28 and admitting steam from line 20' into line 20, coil 21, line 22 and pipe 13, from which the steam is discharged into the treating cylinder 11 through the openings 17. Meanwhile, the cylinder 11 is being rotated by rotation of the shaft 13, said rotation of the shaft being imparted by any suitable means, such as driving means applied to the pulley 27. During such rotation, the finely divided anhydrite in cylinder 11 is thoroughly agitated and each and every particle thereof contacts with the steam injected into cylinder 11 through the opening 17 in the pipe 13. Appreciable condensation in the cylinder 11 is prevented by reason of the external heat applied to the cylinder 11 by the furnace 18. The combustion gases or other heated gases admitted into the housing 10 around cylinder 11 heating said cylinder and thereby preventing condensation of water therein. It is not necessary, however, to supply more heat into the housing 10 through the furnace 18 than is necessary to prevent condensation within the cylinder 11.

The combustion gases within housing 10 are discharged through the stack 19 and thereby impart some of their heat to the steam in coil 21, super-heating said steam before it is injected into the cylinder 11. Preferably, the cylinder 11 is not entirely steam tight, a certain quantity of steam escaping through openings around the edges of cover 12 and although a small proportion of the finely divided anhydrite may be blown out of the cylinder 11 by reason of such escape of steam, the loss is only of a minor quantity.

After the treatment has been carried on for a suitable length of time, say for example of about one-half hour when steam at a temperature of about 300° F. and a pressure of about 60 to 70 pounds is used, the furnace 18 may be discontinued, the supply of steam shut off and the treated anhydrite discharged through the opening 12 into a suitable bin or cooler, such as is used in the manufacture of Portland cement and the like. The treated anhydrite may be simultaneously cooled and dried and after such cooling and drying, may be mixed with a small quantity of accelerator and hardener. The treated anhydrite may be lightly milled either before or after the addition of the accelerator, the milling being very often unnecessary as the anhydrite does not conglomerate during the treatment. Small balls or aggregates may be formed, however, but these are easily disintegrated and if such balls are formed during the process, a light milling may be resorted to.

Although in the above described example and apparatus a batch process is referred to, it will be understood that a continuous process may be also used. For example, instead of using a cylinder 11 which is substantially entirely enclosed, a longer cylinder may be used similar to a standard rotary kiln and the finely divided anhydrite fed into such rotary cylinder continuously and discharged therefrom continuously, or any other suitable apparatus such as, for example, a furnace of the McDougal type may be used.

The product produced in accordance with the above described method and containing, for example, one-half percent each by weight alkali sulphate and common alum will, when mixed with sufficient water to produce a mass of standard consistency (in accordance with A. S. T. M. methods for testing Keene cement and other gypsum products) produce a plastic, cementitious material of appreciably greater plasticity than the best grades of Keene cement, and will set in a period of time comparable to the setting time of Keene cement. My product, however, does not exhibit an increase in volume during the setting, nor does it exhibit a marked decrease in volume during drying, while Keene cement and substantially all other calcium sulphate cementitious materials swell materially during hydration and setting and exhibit a very marked drying shrinkage. The advantages of a cementitious material which neither swells during setting nor shrinks during drying, will be apparent to those having occasion to use such materials.

Furthermore, my product, upon setting, forms a very dense and impermeable mass having a very smooth and hard surface. The crushing strength of compositions made from my product are materially higher than those of any other cementitious material containing calcium sulphate as a major ingredient. My product will show a marked increase in compressive strength, not only at the end of a seven, fourteen or twenty-eight day period, but also in the earlier periods, such as twenty-four hour or three day tests.

In comparison with the best grade of Keene cement available on the market, my product will have a neat compressive strength at seven days of about 4600 pounds and at twenty-eight days a compressive strength of from 5000 to 5400 pounds per square inch, while Keene cement tested under the same conditions, will have a compressive strength of from 200 to 350 pounds per square inch less. In other words, it can be said that my product is capable of producing masses having a compressive strength of about not less than 20% higher than Keene cement.

The peculiar characteristics hereinabove described are apparently caused by the indefinite structure of my material and the peculiar cementing action which takes place during setting and hardening. All of the previous known cementitious materials containing calcium sulphate as a major ingredient crystalize upon hydration and setting, developing long needle-like or star-shaped crystals. Upon observing the hydration (if it may be so called) and hardening of my product under the microscope and at a magnification of say 450 diameters, the development or presence of a definite crystal structure is not observed. The solid masses are of indefinite shape and a cementing solution, apparently a colloid derived from the undefined masses of solid, separates from such solids and bonds the solid particles together. This peculiar action apparently is the reason for the increased plasticity obtained by the use of my material and is the reason for the development of the increased strength, hardness, density and impermeability on the cast or set body.

From the above description it is obvious that various modifications may be made in the process and in the apparatus hereinabove described without departing from the spirit of my invention, hence, I do not wish to be understood as limiting myself to the exact form, construction, arrangement and combination of elements, nor do I wish to be understood as limiting myself to the composition or source of the anhydrite or material containing anhydrite as a major ingredient which is used by me as the raw material. Furthermore, the temperature of treatment, the pressures used during the treatment and the other elements entering into the process are not to be limited to the exact condition existing in the examples cited hereinabove, but all of said elements, steps and conditions may be modified within the scope of the following claims.

I claim:

1. A process of making a cementitious material from a product containing substantially anhydrous $CaSO_4$ as a major ingredient comprising, contacting the material containing substantially anhydrous $CaSO_4$ as a major ingredient with steam at a temperature sufficient to prevent condensation of water on the material.

2. A process of making a cementitious product from a material containing substantially anhydrous $CaSO_4$ as a major ingredient comprising, contacting a material containing substantially anhydrous $CaSO_4$ as a major ingredient and reduced to about 100 mesh and finer with steam under temperature conditions adapted to prevent condensation of steam on the material without appreciably hydrating said material and then drying said heat treated material at a temperature below about 130° F.

3. A process of making a cementitious product from a material containing substantially anhydrous $CaSO_4$ as a major ingredient comprising, contacting a finely divided material containing substantially anhydrous $CaSO_4$ as a major ingredient with steam while agitating said material under temperature conditions adapted to prevent condensation of steam on the material and then cooling, drying and milling said treated material.

4. A process of making a cementitious product from a material containing substantially anhydrous $CaSO_4$ as a major ingredient comprising, contacting the material containing substantially anhydrous $CaSO_4$ as a major ingredient with steam under pressure conditions and at a temperature sufficient to prevent condensation of steam on the material.

5. A process of making a cementitious product from a material containing substantially anhydrous $CaSO_4$ as a major ingredient comprising, contacting the material containing substantially anhydrous $CaSO_4$ as a major ingredient with super-heated steam without appreciably hydrating said material.

6. A process of making a cementitious product from a material containing substantially anhydrous $CaSO_4$ as a major ingredient comprising, contacting a material containing substantially anhydrous $CaSO_4$ as a major ingredient with super-heated steam under pressure and during agitation of the material, under conditions of temperature adapted to prevent condensation of steam on the material.

7. A process of making a cementitious product from a material containing substantially anhydrous $CaSO_4$ as a major ingredient comprising, contacting a material containing substantially anhydrous $CaSO_4$ as a major ingredient with super-heated steam under super-atmospheric pressure conditions and at a temperature sufficient to prevent condensation on the material, then cooling, drying and milling said treated material and then adding accellerating and hardening agents to said treated material.

8. A process of making a cementitious product from a material containing substantially anhydrous $CaSO_4$ as a major ingredient comprising, introducing finely divided material containing substantially anhydrous $CaSO_4$ as a major ingredient into a contacting zone, passing steam through said contacting zone, maintaining a super-atmospheric pressure in said contacting zone, maintaining said contacting zone at a temperature sufficient to prevent appreciable condensation of steam in said zone, then discharging the treated material from said zone and cooling the treated material.

Signed at Redwood City, California, this 14 day of March, 1929.

JOHN E. BUTLER.